Jan. 26, 1954 W. G. PFANN 2,666,977

REVERSIBLE SEMICONDUCTOR AND METHOD OF MAKING IT

Filed Dec. 31, 1948

INVENTOR
W. G. PFANN
BY
[signature]
ATTORNEY

Patented Jan. 26, 1954 2,666,977

UNITED STATES PATENT OFFICE 2,666,977

REVERSIBLE SEMICONDUCTOR AND METHOD OF MAKING IT

William G. Pfann, Chatham, N. J., assignor to Bell Telephone Laboratories, Incorporated, New York, N. Y., a corporation of New York Application December 31, 1948, Serial No. 68,596

6 Claims. (Cl. 29—25.3)

This invention relates to translating devices and more particularly to translating devices employing a body of semiconductive material, and to methods of making such devices.

As is pointed out more fully in Patent 2,524,035, granted October 3, 1950, to J. Bardeen and W. H. Brattain, a body of semiconductive material provided with three suitable connections is capable of acting as an amplifier of electric signals. In one exemplary embodiment such an amplifier comprises a block or slab of N-type germanium material, means for making two closely spaced point contacts to one face of the block and means for making a large area contact to the opposite face. In such a device, the input circuit is between one point contact, called the emitter, and the large area contact, called the base, and the output circuit is between the other point contact, called the collector, and the base. For the N-type material indicated, with a small bias, usually positive, of a fraction of a volt on the emitter and a relatively large negative bias, of the order of tens of volts on the collector, small signal variations at the input appear as large variations in the output circuit with a resultant power gain.

As set forth in the applications of W. H. Brattain, Serial No. 67,781, filed December 29, 1948, and W. G. Pfann, Serial No. 67,797, filed December 29, 1948, certain "forming" and other treatments enhance the amplifying ability of devices of the type described, e. g. by improving the action at the collector connection.

One general object of this invention is to enhance the operating capabilities of semiconductor translating devices and especially of such devices operable as amplifiers.

More specifically, one object of this invention is to enable operation of a three contact translating device of the general construction above described in either direction, that is with either of the point contacts as the emitter and the other as a collector, without substantial variation in the operating characteristics, such as the gain.

A feature of this invention involves a semiconductor triode having two spaced restricted area or point contact connections on the surface of a semiconductor each of said connections being capable of performing either as an emitter connection or as a collector connection.

A further feature of this invention pertains to "forming" each restricted area connection in a device in accordance with the foregoing feature so that it will, when properly connected, serve as a collector of a semiconductor amplifier having substantially equal gain in either direction.

Other and further objects and features of this invention will appear more fully and clearly from the following description of an illustrative embodiment thereof taken in connection with the appended drawings in which.

Semiconductors suitable for use in devices of this invention include germanium and like materials containing minute quantities of significant impurities which comprise one way of determining the conductivity type (either N- or P-type) of the semiconductive material. The conductivity type may also be determined by energy relations within the semiconductor. For a more detailed explanation, reference is made to Patent 2,524,035, which issued October 3, 1950, to J. Bardeen and W. H. Brattain.

The terms N-type and P-type are applied to semiconductive materials which tend to pass current easily when the material is respectively negative or positive with respect to a conductive connection thereto and with difficulty when the reverse is true, and which also have consistent Hall and thermoelectric effects.

The expression "significant impurities" is here used to denote those impurities which affect the electrical characteristics of the material such as its resistivity, photosensitivity, rectification and the like, as distinguished from other impurities which have no apparent effect on these characteristics. The term "impurity" is intended to include intentionally added constituents as well as any which may be included in the basic material as found in nature or as commercially available.

Figure 1:
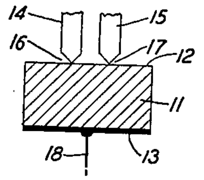
Fig. 1 illustrates one form of translating device illustrative of this invention.

In Fig. 1, only those parts of the translating device requisite to a description of this invention are shown, the housing and the means for supporting the elements in the housing having been omitted in the interest of clarity. At 11 is shown a block or slab of semiconductive material, for example N-type germanium material. On one surface 12 of this block are located two restricted area connections or contact points 14 and 15 which may be of Phosphor bronze or other suitable material. The junctions between surface 12 and the contacts 14 and 15 respectively are designated as 16 and 17 and are on the order of several thousandths of an inch apart. A large area connection 13 is made to the opposite face of block 11 by means of copper plating, solder or the like. Connection may be made to connection 13 by a conductor 18.

The N-type germanium material employed for the block 11 may be prepared in the manner described in the application of J. H. Scaff and H. C. Theuerer, Serial No. 638,351, filed December 29, 1945, or as described in "Crystal Rectifiers" by Torrey and Whitmer, vol. 15, Radiation Laboratory Series (MIT).

Electrical forming procedures for improving the amplification of a translating device of this type are described in the applications of W. H. Brattain and W. G. Pfann, previously noted. Such a method comprises passing through one of the point contacts, known as the collector, sufficient current to exceed the voltage maximum in the reverse direction through this connection with the other contact, called the emitter, connected in the circuit. As a result of such a forming operation, the device becomes a unilateral amplifier. That is, the connection which is formed acts as a collector and is subsequently used as a collector for best results. If the other, unformed point contact is made the collector, very low power gain or possibly power loss will result.

Figure 3:
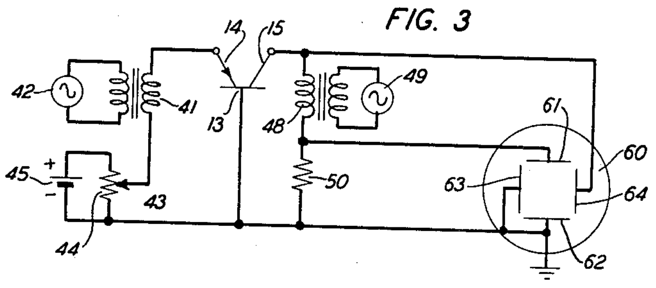
Fig. 3 is a circuit diagram of apparatus for forming the point contacts.

The forming may be done in one way by means of suitable apparatus connected in a circuit such as is shown in Fig. 3. This circuit may also be used to examine the amplifying properties of the semiconductor translator. The connection 14 which is to be the emitter is connected to one terminal of a low impedance secondary 41 of a transformer across the primary of which is impressed an alternating voltage of about 1,000 cycles per second from a signal source 42. The other terminal of winding 41 is connected to a tap 43 of a potentiometer 44 across which is connected a source of voltage such as battery 45 poled as indicated in Fig. 3. The negative terminal of 45 is connected to the base connection 13. The voltage of source 45 may be from 6 to 12 volts and the resistance of 44 may be 500 ohms or less. The tap is ordinarily adjusted so that the effect of one volt in series with 200 ohms or less is achieved. The amplitude of the signal across winding 41 may be about 0.1 volt.

One end of a low impedance secondary winding 48 of an isolating transformer is connected to the connection 15 of the translating device which is to be the collector. An adjustable source 49 of 60 cycles per second alternating voltage is connected across the primary of the isolating transformer. The voltage available across winding 48 should be from 0 to about 135 volts. The other end of the winding 48 is connected through a resistor 50 to the base connection 13. The resistor 50 should be on the order of 5,000 ohms or larger.

To observe the relationship between the current through the collector 15 and the potential difference between the collector 15 and the base 13 suitable connections are made to an indicator such as the cathode ray oscilloscope 60. The voltage across the resistor 50 is applied to the plates 61 and 62 and that between the collector 15 and the base connection 13 to the plates 63 and 64.

With one volt or less on the emitter 14 and about 30 volts across winding 48 the oscilloscope will show a reverse characteristic of the collector 15 with the 1,000-cycles-per-second-signal from source 42 superposed thereon. If the voltage across 48 is then increased until the reverse characteristic of the collector is in the negative resistance region forming will result. This will be indicated by a considerable increase in the amplitude of the signal as seen on the oscilloscope 60. The forming may be controlled by varying both the voltage between 13 and 14 and between 13 and 15. Care must be taken not to "overform" by use of too high a voltage since this will result in an unstable condition with little or no improvement in gain of the amplifier.

Figure 2:
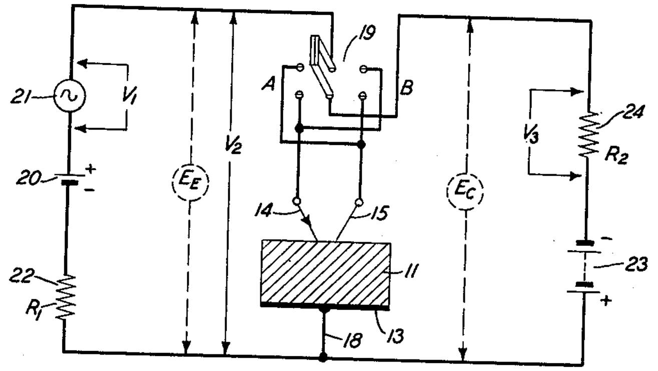
Fig. 2 shows an electrical circuit suitable for measuring the reversible amplifying properties of a translating device made in accordance with this invention.

The circuit illustrated in Fig. 2 may be used to show that a translating device formed in the manner above indicated will act as a unilateral amplifier. In this figure the elements of the translating device are indicated as in Fig. 1, i. e., block 11, the contact points 14 and 15, and the base connection 13. The base connection 13 on the one hand is connected via conductor 18 through a resistor 22 ($R_1$), a biasing source, such as battery 20 and a signal source 21 to a reversing switch 19. On the other hand, the base connection 13 is connected via conductor 18 through a biasing source, such as battery 23, a resistor 24 ($R_2$) to the reversing switch 19. The elements on the left side of the diagram are those ordinarily associated with an emitter and those on the right of the diagram those ordinarily associated with a collector. The reversing switch 19 has two positions A and B such that in the position A the contact 15 is connected as the emitter and the contact 14 as the collector and in position B the contact 14 is the emitter and the contact 15 the collector. If N-type germanium material is used for the block 11 the biasing source 20 is of the order of one volt or less and the biasing source 23 of the order of a few volts to 50 or more volts. In such a circuit the resistor 22 ($R_1$) may be of the order of 200 ohms and the resistor 24 ($R_2$) of the order of 10,000 ohms.

The unilateral translating device tested in the circuit of Fig. 2 with the reversing switch 19 in position B, that is, with the point 14 as the emitter and the point 15 as the collector, will show a power gain of the order of 100 (20 decibels). The power gain in this case may be defined as follows:

$$\text{Power gain} = \frac{(V_3)^2 R_1}{V_2(V_1 - V_2) R_2}$$

where $V_1$, $V_2$ and $V_3$ are respectively the alternating current voltages across source 21, between connections 13 and 14 and across resistor 24 ($R_2$). On the other hand, when the reversing switch is in position A with the electrode 14 as the collector and 15 as the emitter, the values of voltages $V_1$, $V_2$ and $V_3$ will be such that a relatively low power gain or possibly a power loss is indicated.

If it is desired to make a device such as that shown in Fig. 1, a reversible amplifier, which will amplify the same in either direction, it may be done by forming each of the contacts 14 and 15 as a collector. This may be done for example by forming first one contact, say 15, as the collector in accordance with the procedure before noted and then interchanging the connections and forming the other contact, say 14, as a collector. Although both of the point contacts are now formed to act as collectors in relatively high gain amplifiers, this forming appears to in no way seriously degrade the operation of either as an emitter when so connected.

After these forming steps for each of the connections the amplification in each direction at given values of emitter and collector biases, may not be exactly the same in some cases. When this is true and equalization is desired, it can be approached by passing a steady or pulsating forward current through the point having the greatest amplification. The emitter circuit is left open during this step. In the case of N-type semiconductor material for the block 11 the forward direction is that for which the collector is biased positively with respect to the base. Steady currents on the order of 0.1 to 1.0 ampere have been found effective in reducing the amplification of the device in the desired direction.

Another method which may be used to equalize the amplification is to reform by the previously noted over-the-peak method the electrode for which the amplification is the lower when used as a collector.

Referring to Fig. 2 for nomenclature, the respective gains of a reversible unit in each direction, measured in accordance with the various indications on Fig. 2 are as follows:

| Switch Position | $V_1$ | $V_2$ | $V_3$ | $R_1$ | $R_2$ | $E_c$ | $I_c$ | $E_E$ | $I_E$ | Gain |
|---|---|---|---|---|---|---|---|---|---|---|
| A | .088 v. | .038 v. | 5.2 v. | 200ω | 10,000ω | −20 v. | 2.4 ma. | +.03 v. | .48 ma. | 24.5 db |
| B | .088 v. | .038 v. | 4.7 v. | 200ω | 10,000ω | −20 v. | 2.8 ma. | +.03 v. | .55 ma. | 23.7 db |

As indicated by the above figures, the device is capable of giving substantial gain in either direction and this gain is about the same in each case.

Although this invention has been described with respect to a particular embodiment thereof it will be understood that various changes may be made therein without departing from the spirit and scope of the invention.

What is claimed is:

1. The method of making a reversible semiconductor amplifier having two spaced restricted area connections and a large area base connection on a semiconductive body, that comprises electrically forming one restricted area connection by passing a relatively high reverse current therethrough while both restricted area connections are in circuit with the base connection to condition said one connection as a collector connection and then likewise electrically forming the other restricted area connection as a collector connection.

2. In the method of making a reversible semiconductor amplifier having restricted area connections and a base connection in spaced relation on a body of semiconductive material that comprises forming each restricted area connection by passing an electrical current therethrough to produce substantially equal amplification in either direction through the amplifier, the step of further equalizing the amplification that comprises reducing the forming effect on the restricted area connection responsible for the higher amplification by passing a forward current therethrough.

3. The method of making a reversible semiconductor amplifier having restricted area connections and a base connection on a body of N-type germanium material, that comprises electrically forming each restricted area connection as a collector by passing a relatively high reverse current therethrough to the base connection while biasing a second restricted area connection with a forward voltage relative to the base.

4. The method of making a reversible semiconductor amplifier having spaced rectifying contacts and an ohmic base connection on a body of N-type germanium material that comprises forming each of said contacts as a collector by applying thereto an alternating voltage from a source of the order of 100 volts through a resistance of the order of 5,000 ohms while the other contact is for each forming subjected to a forward voltage from a source of the order of one volt through a resistance of the order of not more than 200 ohms.

5. The method of making a reversible semiconductor amplifier having spaced rectifying contacts and an ohmic base connection on a body of N-type germanium material that comprises forming each of said contacts as a collector by successively applying thereto an alternating voltage from a source of the order of 100 volts through a resistance of the order of 5,000 ohms while the other contact is for each forming subjected to a forward voltage from a source of the order of one volt through a resistance of the order of not more than 200 ohms to produce substantially equal amplification in each direction through the amplifier, and then equalizing any small differences of amplification by passing a forward current of the order of 0.5 ampere through the rectifier contact responsible for the higher gain when it is a collector.

6. The method of making a reversible semiconductor amplifier having spaced rectifying contacts and an ohmic base connection on a body of N-type germanium material that comprises forming each of said contacts as a collector by applying thereto an alternating voltage from a source of the order of 100 volts through a resistance of the order of 5,000 ohms while the other contact is for each forming subjected to a forward voltage from a source of the order of one volt through a resistance of the order of 200 ohms to produce substantially equal amplification in each direction through the amplifier, and then equalizing any small differences of amplification by reforming the rectifier contact responsible for the lower amplification when it is a collector.

WILLIAM G. PFANN.

References Cited in the file of this patent

UNITED STATES PATENTS

| Number | Name | Date |
|---|---|---|
| 1,831,744 | Laurent | Nov. 10, 1931 |
| 2,428,400 | Van Geel | Oct. 7, 1947 |
| 2,469,569 | Ohl | May 10, 1949 |
| 2,486,776 | Barney | Nov. 1, 1949 |
| 2,524,035 | Bardeen et al. | Oct. 3, 1950 |

OTHER REFERENCES

Audio Engineering, pgs. 28, 29, 39, August 1938.